(12) United States Patent
Stolp (10) Patent No.: US 9,722,401 B2
(45) Date of Patent: Aug. 1, 2017

(54) CONDUIT

(71) Applicant: THE CARDAN GROUP PTY LTD, Cheltenham, Victoria (AU)

(72) Inventor: Andrew John Stolp, Cheltenham (AU)

(73) Assignee: THE CARDAN GROUP PTY LTD, Cheltenham, Victoria (AU)

( * ) Notice: Subject to any disclaimer, the term of this patent is extended or adjusted under 35 U.S.C. 154(b) by 0 days.

(21) Appl. No.: 14/654,542

(22) PCT Filed: Apr. 8, 2014

(86) PCT No.: PCT/AU2014/000377
§ 371 (c)(1),
(2) Date: Jun. 21, 2015

(87) PCT Pub. No.: WO2014/165904
PCT Pub. Date: Oct. 16, 2014

(65) Prior Publication Data
US 2016/0087415 A1    Mar. 24, 2016

(30) Foreign Application Priority Data

Apr. 12, 2013  (AU) ................ 2013901271

(51) Int. Cl.
*H02G 3/04* (2006.01)
*H02G 3/10* (2006.01)
*H02G 1/08* (2006.01)

(52) U.S. Cl.
CPC ............ *H02G 3/0431* (2013.01); *H02G 1/08* (2013.01); *H02G 3/0418* (2013.01); *H02G 3/105* (2013.01)

(58) Field of Classification Search
CPC .......... H02G 3/00; H02G 3/04; H02G 3/0418; H02G 3/0431; H02G 3/0437; H02G 3/0462; H02G 3/105; H02G 3/10; H02G 3/14; H02G 1/08
USPC ............ 174/480, 481, 68.1, 68.3, 70 C, 506, 174/72 R, 72 A, 72 C, 88 R, 95; 248/68.1, 49
See application file for complete search history.

(56) References Cited

U.S. PATENT DOCUMENTS

| 5,336,849 A | * | 8/1994 | Whitney | .............. | H02G 3/0425 |
| | | | | | 174/72 C |
| 6,084,180 A | | 7/2000 | Debartolo, Jr. | | |

(Continued)

FOREIGN PATENT DOCUMENTS

| DE | 79 36 231 | 3/1980 |
| EP | 1241758 | 9/2002 |

(Continued)

OTHER PUBLICATIONS

International Search Report for PCT/AU2014/000377.
EP Supplementary Search Report for Application No. EP 14 78 2676 dated Oct. 11, 2016.

*Primary Examiner* — Angel R Estrada
(74) *Attorney, Agent, or Firm* — Neifeld IP Law, P.C.

(57) ABSTRACT

Disclosed herein is a conduit for electrical cables. The conduit comprises a cover operable to expose an inside of the conduit, and pathways for the electrical cables. The conduit is adapted to be attached to an exterior surface of a RV, with apertures via which the electrical cables can pass into and out from an interior of the RV being accessible from within the conduit.

19 Claims, 6 Drawing Sheets

(56) References Cited

U.S. PATENT DOCUMENTS

| | | | |
|---|---|---|---|
| 6,259,020 B1* | 7/2001 | Ashline | H02G 3/0431 174/68.3 |
| 6,444,906 B1 | 9/2002 | Lewis | |
| 6,510,608 B1 | 1/2003 | Marshall et al. | |
| 6,664,467 B1* | 12/2003 | de la Borbolla | H02G 3/14 174/68.3 |
| 6,972,367 B2* | 12/2005 | Federspiel | H02G 3/0418 174/68.3 |
| 7,009,108 B2* | 3/2006 | Vargas | H02G 3/0418 174/68.3 |
| 7,456,366 B2* | 11/2008 | Makwinski | H02G 3/0431 174/68.3 |
| 7,589,286 B2* | 9/2009 | VanderVelde | H02G 3/0418 174/68.3 |
| 7,654,841 B2* | 2/2010 | Arflack | H02G 3/128 174/68.3 |
| 7,829,797 B2* | 11/2010 | VanderVelde | H02G 3/0418 174/481 |
| 7,964,804 B2* | 6/2011 | Kaplan | H02G 3/0431 174/68.1 |
| 8,183,471 B2* | 5/2012 | Handler | H02G 3/0418 174/68.3 |

FOREIGN PATENT DOCUMENTS

| | | |
|---|---|---|
| EP | 1808365 | 7/2007 |
| WO | WO 2011/045034 | 4/2011 |

\* cited by examiner

CONDUIT

CROSS REFERENCE TO RELATED APPLICATIONS

This application is a national stage entry of PCT/AU2014/000377, filed Apr. 8, 2014, which claims priority to Australian application 2013901271, filed Apr. 12, 2013, both of which are incorporated herein by reference.

TECHNICAL FIELD

The present invention relates to a conduit for electrical cables. In particular, the present invention relates to a conduit for electrical cables that is adapted to be attached to an exterior surface of a RV (recreational vehicle).

BACKGROUND ART

Due to the nature of their construction, it can often be difficult to install electrical wiring into RVs. The void between the interior and exterior walls of the RV is relatively small, with numerous partitions typically being required to impart the necessary structural strength to the RV. Whilst apertures are provided in the struts separating the voids in order to pass electrical wiring between adjacent voids, installing electrical wiring into RVs is nonetheless a very fiddly and time consuming job.

This structure can also cause significant problems should the owner of a RV ever want to retro-fit any electrical appliances, because it is difficult to access these voids once the walls of the RV have been installed.

SUMMARY OF INVENTION

In a first aspect, the present invention provides a conduit for electrical cables. The conduit comprises a cover operable to expose an inside of the conduit, and pathways for the electrical cables. The conduit is adapted to be attached to an exterior surface of a RV, with apertures via which the electrical cables can pass into and out from an interior of the RV being accessible from within the conduit.

Advantageously, the conduit of the present invention provides pathways for electrical cables that are not located in the voids between the interior and exterior walls of the RV. Whilst the electrical cables need to pass into the voids at some stage in order to be connected to an electrical appliance inside the RV, the majority of the electrical cable can be located in a much more readily accessible position.

Further, retro-fitting of electrical appliances in a RV would be much easier if a conduit of the present invention was present on the RV because it would no longer be necessary to access multiple voids to pass the electrical cable from the appliance to the power source. All that would need to be done is to access a void behind the new electrical appliance via an aperture in the internal wall of the RV, pass the electrical cable from the appliance into the void and then through an aperture in the outside wall and into the conduit, where the cable can be easily associated with a pathway that leads to the power source. The apertures in the inside and outside walls may already be present but, if not, a new hole or holes could readily be provided (e.g. by drilling).

As used herein, the term "RV" is to be understood to mean not only a RV, but also a caravan, bus, motor home, travelling trailer, camper trailer, transportable home or office, and any other similar mobile structure.

In some embodiments, the conduit is attachable to an exterior surface of a RV via a surface of the conduit that can substantially conform to the exterior surface of the RV.

In some embodiments, the conduit has a shape that can substantially conform to the exterior surface of the RV. In such embodiments, the conduit can closely follow the exterior surface of the RV in a physically (and potentially visually) unobtrusive manner. Such a shape may be safer in that there would be less risk of a person catching clothing or the like on an exposed surface of the conduit.

In some embodiments, the conduit is an elongate hollow member. In some embodiments, the conduit has a low profile (e.g. a strip or a panel).

In some embodiments, the conduit is adapted to be adhered to the exterior surface of the RV. For example, an entire substantially planar surface of the conduit may be provided with an adhesive which, when stuck to an outer surface of the RV, permanently and strongly attaches the conduit to the RV.

In some embodiments, the conduit is adapted to be fixed to the exterior surface of the RV by a fixing means (e.g. a screw or other suitable fastener).

In some embodiments, the conduit is adapted to be fixed to the exterior surface by a combination of fixing means and an adhesive.

Alternatively, the conduit can, in some embodiments, be adapted to be fixed directly to the struts separating the voids between the interior and exterior walls of the RV.

In some embodiments, the length of the conduit is substantially the same as a length of the RV. Such a conduit enables access to internal voids along the entire length of the RV. In some embodiments, the conduit may also extend completely around the entire RV, thereby linking all electrical items inside (and outside) the RV to the power source, regardless of which internal wall the electrical item is on or near.

In some embodiments, the cover extends along part of the conduit, or substantially the entire length of the conduit.

In some embodiments, the cover may be hingedly operable to expose the inside of the conduit. Alternatively, the cover may be slidably operable to expose the inside of the conduit. Alternatively, the cover may be operable to expose the inside of the conduit by being detachable/attachable via a snap-fitting type mechanism. Alternatively, the cover may be operable to expose the inside of the conduit by being detachable/attachable by screwing (or the like) to the conduit or RV.

In some embodiments, separate pathways are provided for electrical cables carrying different voltages (e.g. 240 V AC or 12 V DC). In such embodiments, should an electrician ever need to retro-fit an electrical appliance in the RV, the electrician could readily locate an appropriate electrical cable.

In some embodiments, the conduit further comprises clips for retaining electrical cables in their respective pathways.

In some embodiments, the conduit further comprises electrical sockets (e.g. power points for 240 V AC or 12 V DC appliances) on an external surface thereof.

In some embodiments, the conduit further comprises a means for receiving and supporting a structure (e.g. a table or a rack for hanging items to dry), whereby the structure can depend from the conduit. The means for receiving and supporting a structure may, for example, be a channel in the conduit, the channel being adapted to receive and retain a complementary portion of the structure.

In some embodiments, the conduit further comprises a source of light on an external surface thereof.

In a second aspect, the present invention provides a method for installing electrical cables in a RV. The method comprises passing an electrical cable through an aperture in an internal wall of the RV, and passing the electrical cable into a conduit of the first aspect which has been attached to an exterior surface of the RV.

In some embodiments, the aperture in the internal wall of the RV is provided by drilling a hole in the internal wall of the RV.

In some embodiments, the method further comprises drilling a hole through an external wall of the RV covered by the conduit in order to enable the electrical cable to pass into the conduit (e.g. if there is no existing aperture linking the void between the internal and external walls of the RV and the conduit).

BRIEF DESCRIPTION OF THE DRAWINGS

A specific embodiment of the invention will now be described, by way of example only, with reference to the accompanying drawings, in which.

DESCRIPTION OF EMBODIMENTS

The present invention provides a conduit for electrical cables. The conduit comprises a cover operable to expose an inside of the conduit, and pathways for the electrical cables. The conduit is adapted to be attached to an exterior surface of a RV, with apertures via which the electrical cables can pass into and out from an interior of the RV being accessible from within the conduit.

Typically, the exterior surface of a RV is formed by attaching cladding panels to vertical struts which provide the strength to the walls of the RV. The cladding panels are typically constructed from materials such as fibreglass, aluminium, steel and composites, and are substantially weather proof and resistant to the normal wear and tear associated with road travel. The panels often have relatively flat surfaces, but sometimes have a texture or surface pattern (e.g. ribbing) on them. The panels can have various sizes, ranging from a size which covers the entire side of the RV to a size which covers only a portion of the side, with the smaller sized panels being overlaid to provide a continuously cladded exterior surface.

The conduit of the present invention is adapted to be attached to the exterior surface (typically an outer wall, at a height where it is readily accessible and where the additional features discussed below will be useable) of a RV. The conduit therefore requires features (e.g. physical attributes) which make it suitable for attaching to the exterior surface of the RV. In some embodiments, the conduit may have a surface that is substantially conformable to the exterior surface of the RV. In such embodiments, the surface contacting portion of the conduit will form a very close association with the exterior surface of the RV when they are attached. For example, the conduit may have a shape that enables it to substantially conform to the RV's exterior surface (e.g. a shape that substantially matches any surface patterns on the RV's cladding panels). Alternatively (or in addition), the conduit may have a profile which substantially conforms with the profile of the RV's exterior surface. Alternatively (or in addition), the conduit may be made to look similar to panelling or other visual features already present on the exterior surface of the RV.

In some embodiments, the conduit may be recessed a distance into the RV wall surface so as to minimise its protrusion out from the wall. For example, the conduit may be directly attached to the struts that define the voids in the walls of the RV, with cladding panels positioned above and below the conduit. Such an arrangement not only reduces the amount of cladding material required to make the exterior wall of the RV, but also enables direct access from the interior of the conduit to the void (i.e. it would not be necessary to drill a hole in the cladding on order to access the void).

Once attached to the exterior surface of the RV, a conduit of the present invention can be relatively visually unobtrusive. Alternatively, in some embodiments, it may be desirable to make the conduit visually contrasting to the remainder of the cladding of the RV for aesthetic purposes. For example, the conduit may be a different (typically darker) colour than the cladding of the RV in order to provide the appearance of a "racing stripe". The conduit may also have a pattern along all or part of its length to increase its visual aesthetic (e.g. the conduit may have a vinyl sticker depicting a pattern on it).

The conduit of the present invention typically has a profile that is not substantially proud of the RV's surface. In this manner, the conduit provides the numerous advantages described herein, but without the risk of being damaged by being caught on items outside of the RV (e.g. trees or poles), or the risk of a person catching themselves (e.g. their clothing) on an external surface of the conduit.

Typically, the conduit has a surface that substantially conforms to the exterior surface of the RV. In use, such a surface can be placed onto and substantially conform to the surface of the RV, providing the maximum surface area in order to securely hold the conduit onto the RV, as well as substantially preventing the ingress of water, dust, etc. into the conduit (and possibly from there into the interior of the RV).

The conduit is typically a relatively thin elongate hollow member (such as a strip or a panel having a low profile). Such conduits are relatively easy to form (e.g. via extrusion) and handle, and can readily be cut to a desired length for a particular RV.

The conduit may be attached to the exterior surface of the RV in any suitable manner. For example, the conduit may be adapted to be adhered to the exterior surface of the RV using any suitable adhesive for attaching the conduit to the material from which the exterior surface of the RV in made. Alternatively (or in addition), the conduit may be adapted to be fixed to the exterior surface by fixing means (e.g. screws or other, similar, fasteners). The conduit can be affixed to the RV during manufacture of the caravan (e.g. between upper and lower cladding panels, as discussed above). Alternatively, the conduit may be retro-fitted to the RV (e.g. by adhering to the external cladding of the RV). The conduit should ideally be fixed to the RV such that water, dust and other potential contaminants substantially cannot enter the conduit once attached to the RV.

The conduit can be as long or short as desired. For example, for some RVs, the conduit may only need to span a few meters along a side of the RV. However, the length of the conduit is typically substantially the same as the length of the RV, so that electrical wiring may be passed into and out from electrical appliances located practically anywhere inside the RV. In some embodiments, the conduit may extend along both sides of, or around the entire outside perimeter of the RV to provide the maximum possible opportunities for retro-fitting of electrical appliances anywhere inside (or outside) the RV.

Typically, the conduit is attached to the RV in a substantially horizontal orientation. In some embodiments, however, the conduit may be attached to the RV in a non-horizontal orientation, for example, a diagonal or substantially vertical orientation. In some embodiments, it may be desirable to provide two (or more) conduits on an external wall of the RV. For example, larger RVs could benefit from two parallel conduits extending along upper and lower portions of its side wall(s).

The conduit also has a cover operable to expose the inside of the conduit and any electrical cables located therein. Typically, the cover extends along substantially the entire length of the conduit, although it may be provided in sections so that not all of the cover needs to be lifted at the same time in order to access the inside of the conduit. Some portions of the conduit may not even have a cover operable to expose an inside of the conduit (they would still need to be covered to prevent the ingress of dirt etc. into the conduit), provided that the electrical pathways in those sections are able to be accessed (e.g. by sliding electrical cables along a pathway accessible from a portion of the conduit that does have a cover operable to expose an inside of the conduit).

The cover may be opened using any known technique, but is typically hinged along one edge thereof to the rest of the conduit so that it is hingedly operable to expose the inside of the conduit. Alternatively, the cover may be joined to the remainder of the conduit via a snap fitting that is operable to completely remove the cover. Alternatively, portions of the cover may be slidable with respect to the conduit to allow access to the inside of the conduit.

The conduit also provides pathways inside of the conduit for the electrical cables. In order to clearly distinguish between types of electrical cables, in some embodiments, separate pathways are provided for electrical cables carrying different voltages (or currents) or electrical cables that are electrically connected to appliances in similar areas of the RV (e.g. they all pass through the same aperture and into the same internal void). Clips for retaining electrical cables in their respective pathways can be provided inside the conduit, making it easier to hold and bundle cables in their respective pathways.

In some embodiments, the cable pathways for carrying different types of electrical cables (e.g. cables for carrying 240 V (or 110 V) AC and 12 V DC) may be physically separated by thin strip of plastic or other material that can be inserted into a clip recess. This cable separation strip in some embodiments may be a permanent feature that is part of the conduit itself. It can be useful to separate electrical cables carrying 12 V DC from other electrical cables because they can build up a lot of heat and, in some cases, even melt. The cable separation strip can provide such separation.

In use, the conduit of the invention provides pathways for electrical cables that are not located in the voids between the interior and exterior walls of the RV. Whilst the electrical cables need to pass into the voids at some stage in order to be connected to the electrical appliance inside the RV, the majority of the electrical cables can be located in a much more readily accessible position. As will be appreciated, such an arrangement significantly simplifies the electrical wiring of RVs.

Further, retro-fitting of appliances in RVs having a conduit of the present invention would be much simpler than for existing RVs. All an electrician would need to do is to access a void behind the newly installed electrical appliance (e.g. by drilling a hole in the internal wall of the RV), pass the electrical cable from the appliance into the void, where the cable can be accessed using known techniques and drawn through an aperture (either provided already or also drilled by the electrician) in the outside cladding and into the conduit. The electrical cable can then be either carried through the conduit to the RV's power source, or spliced to an electrical cable in the conduit which is already connected to the power source.

The apertures within the conduit provide access for electrical cables located outside of the RV into the internal void. As they are inside the conduit, they not exposed to the elements. Nevertheless, in some circumstances, it may be appropriate to seal the aperture in the external wall using a silicon-based sealant (or the like) to even further hinder the ingress of water or dust etc. into the RV.

The conduit of the present invention may also provide useful features to the exterior of the RV. For example, the conduit may have electrical sockets on an external surface thereof. The conduit may also have a source of light on an external surface thereof. For example, lights could be provided on an underside of the conduit to illuminate the area surrounding the RV.

The conduit may also have a means for receiving and supporting a structure (e.g. a table for storing items or eating from, or a rack for hanging items), whereby the structure can depend from the conduit.

For example, the means for receiving and supporting a structure may be provided in the form of a channel in the conduit, the channel being adapted to receive and retain a complementary portion of the structure.

Components of the conduit of the present invention can be made from any suitable material (e.g. metal or plastic) and by any suitable process (e.g. by extrusion, pultrusion, injection moulding, casting or fabrication). The conduit may, for example be made from one or more materials selected from: aluminium, steel, plastic or a composite material.

A specific embodiment of the present invention will now be described with reference to the accompanying Figures.

Figure 1:
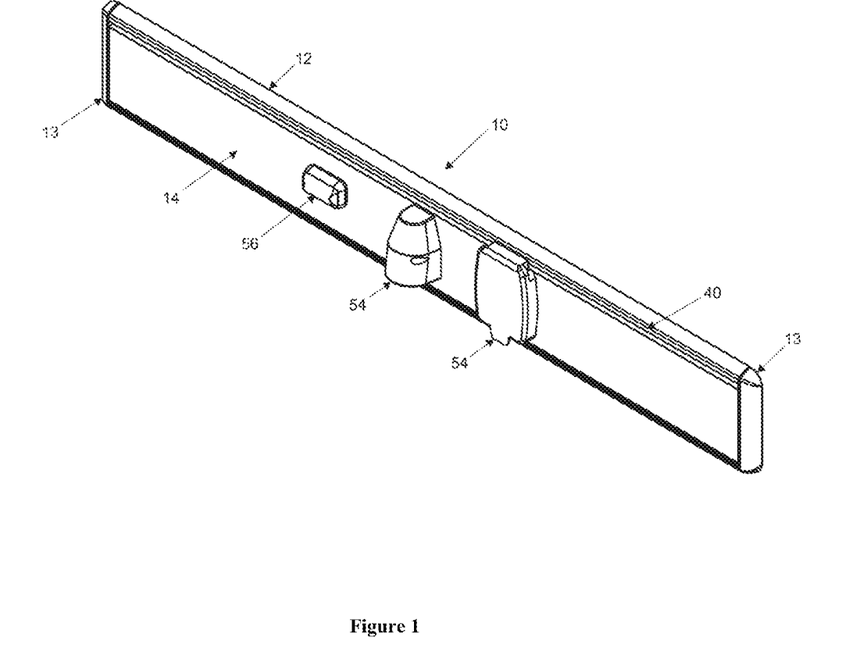
FIG. 1 shows a perspective view of a conduit adapted to be attached to an exterior surface of a RV in accordance with an embodiment of the invention.
Figure 2:
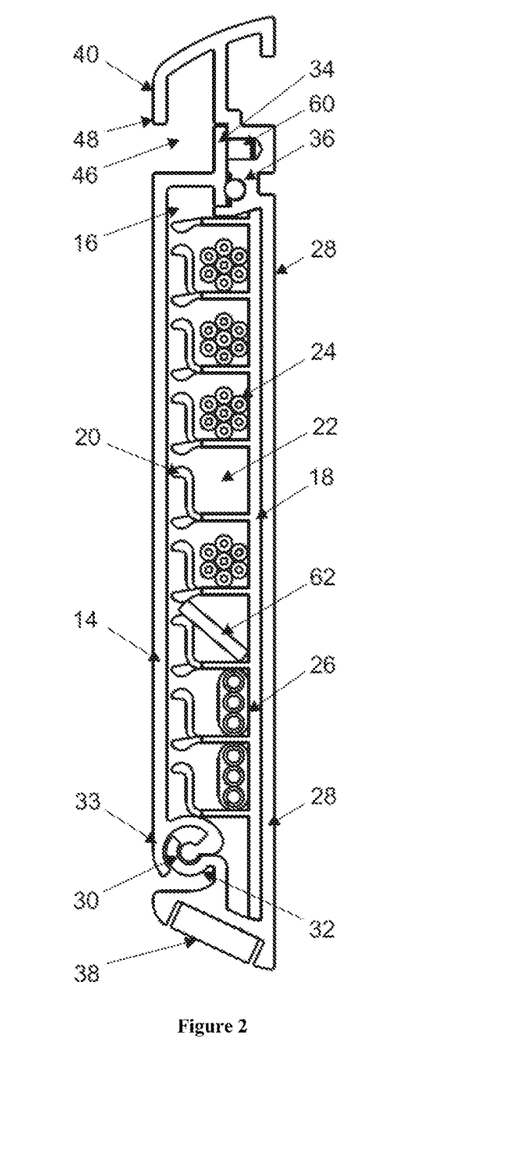
FIG. 2 shows a side cross-sectional view of the conduit of FIG. 1 with the cover in a closed position.
Figure 3:
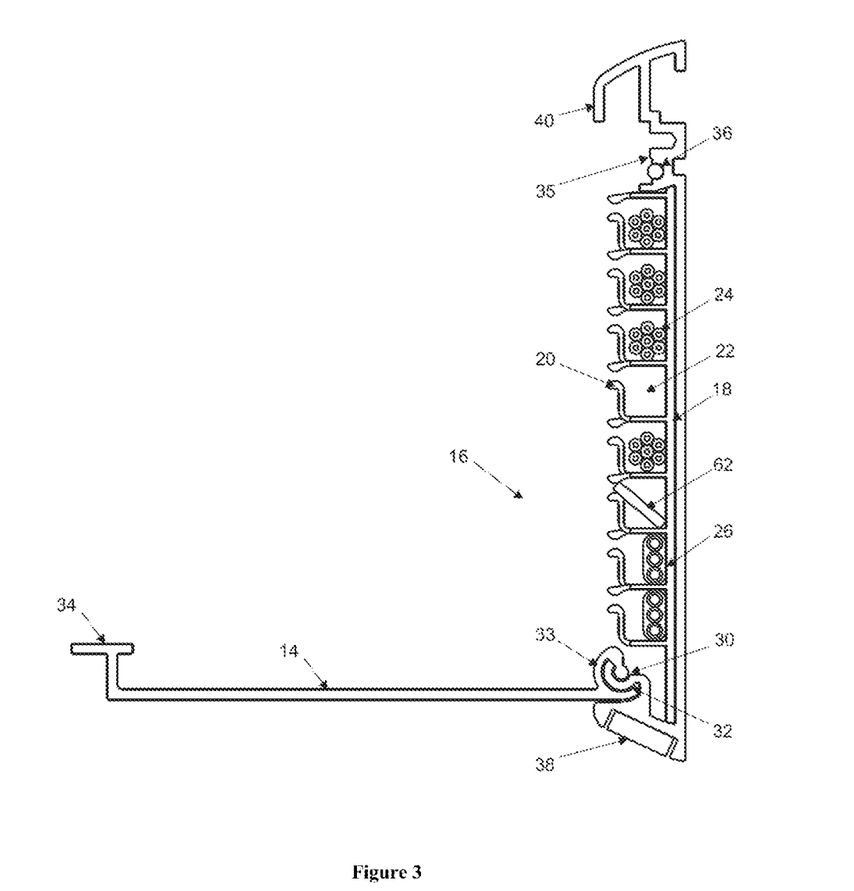
FIG. 3 shows a side cross-sectional view of the conduit of FIG. 1 with the cover in an open position.
Figure 4:
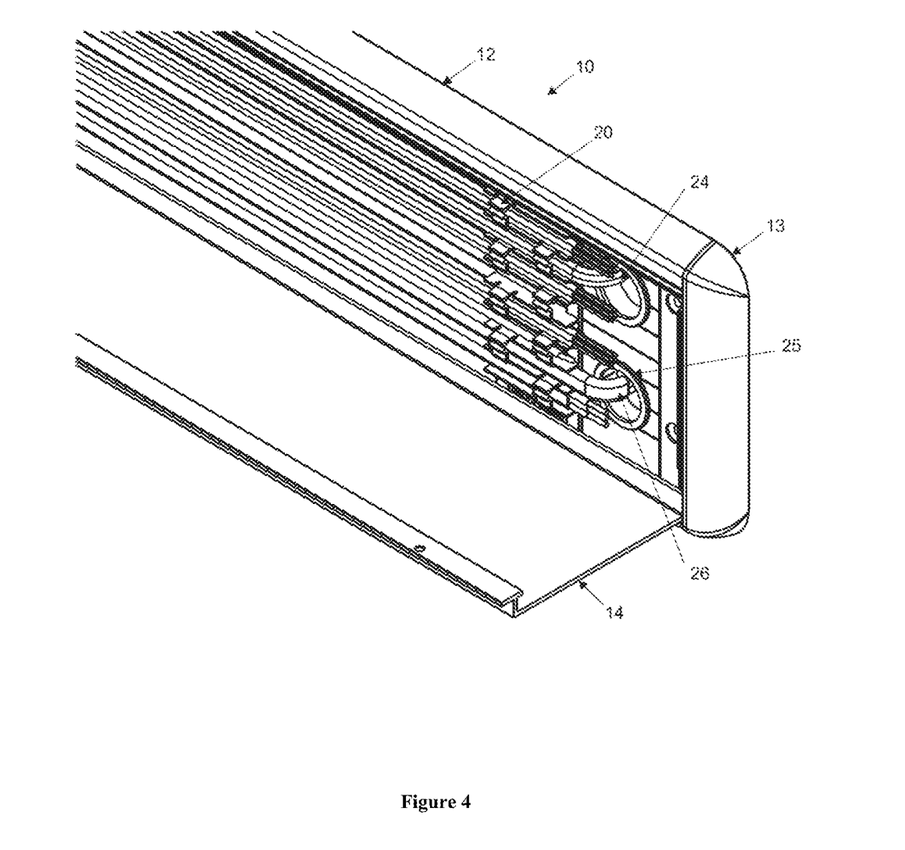
FIG. 4 shows a perspective view of the conduit of FIG. 1 with the cover in an open position.
Figure 7:
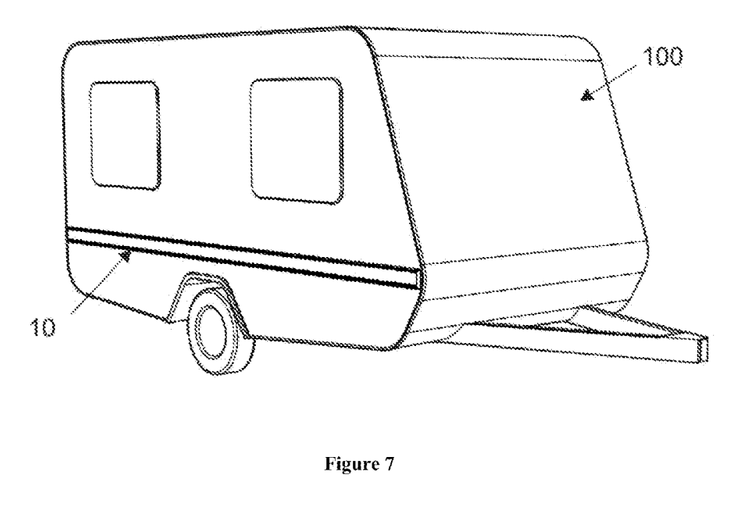
FIG. 7 shows a caravan having a conduit in accordance with an embodiment of the invention attached to its exterior surface.

Referring firstly to FIGS. 1 to 4 and 7, shown is a conduit 10 attached to the side of a caravan 100 (see FIG. 7). Conduit 10 has a body 12 with ends 13, 13 and a cover 14, which is operable between a closed position (FIG. 2) and an open position (FIG. 3). An interior 16 of the conduit is defined by body 12 and cover 14. Interior 16 includes a mounting 18 with resilient arms 20 that define a number of enclosures 22 that can receive and retain a number of 12 volt DC electrical cables 24 and, separately, a number of 240 volt AC electrical cables 26. As shown in FIGS. 2 to 4, electrical cables 24 and 26 can be separated for neatness and in order to lessen the likelihood of different cables being confused, and a number of cables 24 can be bundled, especially if all of the bundled cables pass through the same aperture into the caravan 100. As will be appreciated, the height of conduit 10 can be adjusted in order to fit more or less enclosures 22 than those shown in the Figures. A physical separator in the form of a plastic strip 62 may be provided in an enclosure 22 separating the 12 volt DC electrical cables 24 and, separately, a number of 240 volt AC electrical cables 26, for the reasons discussed above.

As can be seen in FIG. 4, apertures 25 can be provided in the body 12 in order for cables 24, 26 to pass from their enclosures 22, 22 into the interior of the caravan. Such apertures can be provided at spaced apart intervals along the conduit 10 in case it is desired to retro-ft an electrical appliance to the caravan. Apertures 25 are aligned with corresponding apertures in the side walls of caravan 100 (not shown in FIG. 4). If, however, an aperture is not conveniently located, one can be made (e.g. by drilling) through the body 12 (and the wall of the caravan if the conduit is attached to the wall and not directly to the struts in the void between the inner and outer walls).

The conduit 10 can be attached to the caravan 100 via an adhesive backing 28. Alternatively, conduit 10 may have holes (not shown) adapted to receive fasteners such as screws that screw the conduit 10 onto the caravan 100 using known techniques. As conduit 10 is provided as a panel of similar shape and proportion to any other panels on the cladding on the side of the caravan 100 (see FIG. 7), the conduit 10 does not project too far out from the caravan, but effectively blends in with the caravan and is not particularly visually distinct (unless it is provided having a visually distinct colour or pattern for aesthetic reasons). The conduit 10 can be affixed to the caravan 100 during manufacture of the caravan, either by affixing it to the cladding already installed on the caravan or by affixing it between cladding panels (not shown). Alternatively, the conduit 10 may be retro-fitted to a caravan. If necessary (e.g. because one or more additional items will be depending from the conduit 10, as discussed below), it may be appropriate to use a combination of fixing means such as an adhesive and screws and the like to even more securely attach the conduit 10 to the caravan 100.

The cover 14 is hingedly attachable to the body 12 via hinge 30. Hinge 30 is defined by a semi-circular member 32 on body 12 and complementary shaped jaws 33 on cover 14. In use, cover 14 is hingable with respect to body 12 between semi-circular member 32 and complementary shaped jaws 33 via the pivotal movement illustrated by comparing FIGS. 2 and 3. The cover 14 is held in the closed position (FIG. 2) by a snap-fitting between a rim 34 on the cover 14 and a recess 35 provided in the body 12. If desired, a screw 60 can be used to even more securely hold the cover 14 in the closed position. A bead 36 is provided in a recess of body 12 in order to deter as best possible the ingress of moisture, dust, etc. into the interior 16.

In use, a person wishing to install an electrical appliance (not shown) would open the cover 14 and then (assuming an appropriate hole was not already available) drill a hole through the body 12 and the exterior wall of the RV at a location appropriate to access the void between the RVs internal and external walls (not shown). Small v-grooves (which can be seen in FIG. 4) may be provided running along the interior surface of the body 12 in order to provide a recess for stabilising a drill bit when it is desired to drill a hole. If necessary, another hole would then be drilled through the interior wall of the RV (either adjacent to, or directly behind, the new appliance) and the cables 24 passed through one hole and retrieved from the other (using techniques well known in the art). It is then a simple matter for an electrician to electrically connect the appliance to the power source, arrange the cables 24 (or 26) in the appropriate enclosure 22 and close the cover 14. As the conduit 10 is affixed to the wall of the RV and, when the cover is closed, relatively impervious to the ingress of moisture and dirt, it is unlikely that the aperture in the outside wall of the RV will allow water or dust to enter into the RV. However, if desired, once the electrical appliance is installed and working, the aperture in the outside wall of the RV could be filled in using a silicon-based sealant or the like.

The conduit 10 may also be provided with a source of light, such as LED lights 38, on an underside thereof in order to illuminate the area directly surrounding the RV and make the RV easily recognisable at night.

Figure 5:
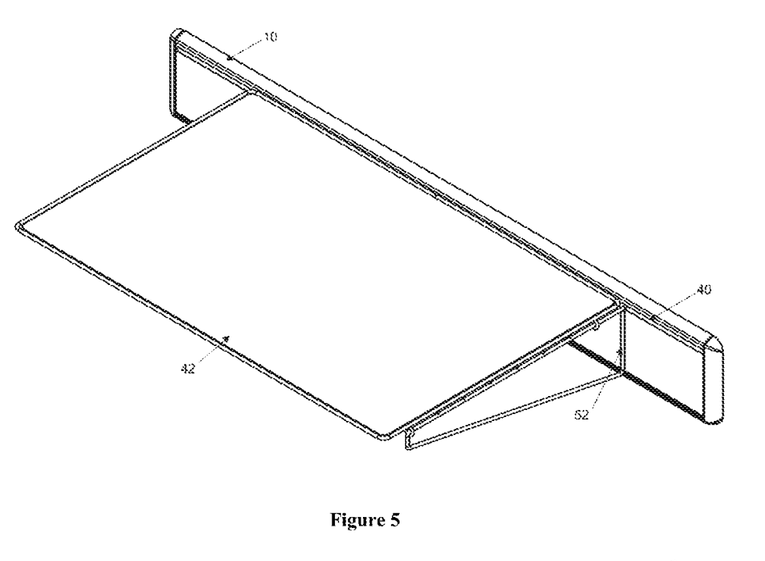
FIG. 5 shows a perspective view of the conduit of FIG. 1 with a table depending from it.
Figure 6:
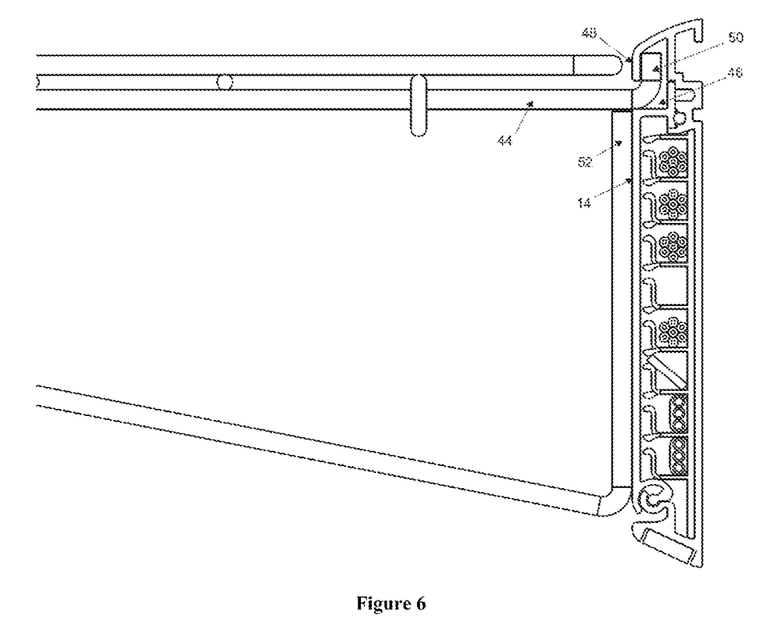
FIG. 6 shows a side cross-sectional view of the conduit and table of FIG. 5.

The conduit 10 may also be provided with a retaining portion 40, via which objects such as tables 42 (FIG. 5) and hanging racks 44 (FIG. 6) can be hung. Retaining portion 40 includes a cavity 46 and a lip 48 (see FIG. 2). As can best be seen in FIG. 6, the table 42 and hanging rack 44 (or other object) can have retaining members 50 and supports 52 at opposite ends thereof. In use the table 42 (for example) is positioned adjacent to the conduit 10 and rotated until it is possible to insert both retaining members 50, 50 into cavity 46. Once the retaining members 50, 50 are both inside cavity 46, the table 42 is rotated such that the table 42 is substantially horizontal, at which stage the supports 52 abut the cover 14 and the retaining members 50 abut the lip 48. The table 24 is then supported by the conduit 10 on the side of the caravan 100 and can be used.

As can be seen in FIG. 1, the conduit 10 may also be provided with additional features, such as electrical power outlets 54 (12 V DC and/or 240 V AC) and illuminated travelling lights 56.

Those of skill in the art will appreciate that numerous modifications or changes can be made to the particular embodiment described above without departing from the scope of the invention. All such modifications and changes are intended to be included within the scope of the appended claims In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A mobile structure comprising a conduit for electrical cables attached to an exterior surface thereof, the conduit comprising:
   a base comprising at least one aperture through which electrical cables ran pass into and out from an inside of the conduit,
   a cover operable to expose the inside of the conduit, and
   pathways for the electrical cables, said pathways being defined by an array of cable retaining clips (20) inside the conduit,
   wherein said conduit is attached to an exterior surface of a mobile structure with the at least one aperture positioned such that the electrical cables can pass behind an electrical device in an interior of said mobile structure and between said inside of the conduit and said interior in order to access a void between an interior wall of said mobile structure and an exterior wall of said mobile structure.

2. The conduit of claim 1, wherein the base has an outer surface that is substantially conformable to the exterior surface of the mobile structure.

3. The conduit of claim 1, wherein the base has a shape that is substantially conformable to the exterior surface of the mobile structure.

4. The conduit of claim 1, wherein the conduit is an elongate hollow member having a low profile.

5. The conduit of claim 1, wherein the base is adapted to be adhered to the exterior surface of the mobile structure.

6. The conduit of claim 1, wherein the conduit is adapted to be attached to the exterior surface of the mobile structure by a fixing means.

7. The conduit of claim 6, wherein the fixing means comprises a screw to more securely hold said cover in a closed position,
further comprising a head provided in a recess of a body of said conduit to deter the ingress of moisture and dirt from entering said interior.

8. The conduit of claim 1, wherein the length of the conduit is substantially the same as a length of the mobile structure.

9. The conduit of claim 1, wherein the cover extends along substantially the entire length of the conduit.

10. The conduit of claim 1, wherein the over is hingedly operable to expose the inside of the conduit,
wherein, when said cover is closed, said cover prevents moisture and dirt from entering said mobile structure.

11. The conduit of claim 1, wherein separate pathways are provided for electrical cables carrying different voltages.

12. The conduit of claim 1, wherein the conduit further comprises electrical sockets on an external surface thereof.

13. The conduit of claim 1, wherein the conduit further comprises a means for receiving and supporting a structure, whereby the structure can depend from the conduit.

14. The conduit of claim 13, wherein the means for receiving and supporting a structure is a channel in the conduit, the channel being adapted to receive and retain a complementary portion of the structure.

15. The conduit of claim 13, wherein the structure is a table or rack for hanging items.

16. The conduit of claim 1, wherein the conduit further comprises a source of light on an external surface thereof.

17. A method for installing electrical cables in a mobile structure comprising, a conduit for electrical cables attached to an exterior surface thereof, the method comprising:
passing an electrical cable through an aperture in an internal wall of the mobile structure; and
passing the electrical cable through the aperture and into the inside of a conduit of claim 1 which has been attached to an exterior surface of the mobile structure.

18. The method of claim 17, wherein the aperture in the internal wall of the mobile structure is provided by drilling a hole in the internal wall of the mobile structure,
wherein said internal wall comprises small v-grooves which run along said interim wall in order to provide a recess for stabilizing a drill bit for drilling said hole.

19. The method of claim 17, comprising drilling a hole through an external wall of the mobile structure covered by the conduit in order to enable the electrical cable to pass into the conduit,
wherein said conduit can be adapted to be fixed directly to struts separating said void between said interior walls of said mobile structure and said exterior walls of said mobile structure to enable direct access from said inside of said conduit to said void.

* * * * *